(12) United States Patent
Turnbach et al.

(10) Patent No.: US 8,501,062 B2
(45) Date of Patent: Aug. 6, 2013

(54) METHOD FOR MAKING A COMPOSITE ARTICLE

(75) Inventors: James F. Turnbach, Troy, MI (US);
David R. Phelps, Ferndale, MI (US);
Danny Snider, Trenton, MI (US)

(73) Assignee: BASF Aktiengesellschaft,
Ludwigshafen (DE)

( * ) Notice: Subject to any disclaimer, the term of this patent is extended or adjusted under 35 U.S.C. 154(b) by 0 days.

(21) Appl. No.: 13/552,304

(22) Filed: Jul. 18, 2012

(65) Prior Publication Data

US 2012/0280416 A1    Nov. 8, 2012

Related U.S. Application Data

(62) Division of application No. 11/677,062, filed on Feb. 21, 2007, now Pat. No. 8,318,296.

(60) Provisional application No. 60/776,294, filed on Feb. 24, 2006.

(51) Int. Cl.
*B29C 65/00* (2006.01)
*B32B 37/00* (2006.01)
*B32B 3/26* (2006.01)

(52) U.S. Cl.
USPC .......... 264/46.5; 267/41; 267/45.1; 267/46.4; 267/46.6; 267/241; 267/259; 267/261; 267/263

(58) Field of Classification Search
USPC ............... 264/41, 45.1, 46.4, 46.5, 46.6, 241; 264/259, 261, 263; 156/145, 292, 297; 428/85, 428/95, 304.4
See application file for complete search history.

(56) References Cited

U.S. PATENT DOCUMENTS

| | | | |
|---|---|---|---|
| 2,896,304 A | 7/1959 | Peroni | |
| 4,050,978 A * | 9/1977 | Moore | 156/300 |
| 4,322,260 A | 3/1982 | Conlon | |
| 5,135,594 A | 8/1992 | Johnston | |
| 5,716,439 A | 2/1998 | Turnbach | |
| 5,866,051 A | 2/1999 | Lin et al. | |
| 5,876,534 A | 3/1999 | Erhardt | |
| 5,919,575 A | 7/1999 | Bowns, IV et al. | |
| 6,076,246 A * | 6/2000 | McCooey | 29/469.5 |
| 6,654,578 B2 | 11/2003 | Suzuki et al. | |
| 6,720,058 B1 | 4/2004 | Weeks et al. | |
| 6,821,366 B2 | 11/2004 | Allison et al. | |
| 6,887,911 B2 | 5/2005 | Shidaker et al. | |
| 2004/0123934 A1 | 7/2004 | Hamrick et al. | |
| 2005/0211365 A1 | 9/2005 | Kurabe et al. | |
| 2007/0010644 A1 | 1/2007 | Erickson et al. | |
| 2007/0202316 A1 | 8/2007 | Turnbach et al. | |

* cited by examiner

*Primary Examiner* — Christina Johnson
*Assistant Examiner* — Atul P. Khare
(74) *Attorney, Agent, or Firm* — Howard & Howard Attorneys PLLC

(57) ABSTRACT

A composite includes a first preform and a second preform spaced from and in overlying relationship to the first preform. The second preform defines at least one first opening extending therethrough along an axis transverse to the first preform. A first surface layer is disposed adjacent to the second preform and on an opposite side of the second preform from the first preform. A polymeric composition including the reaction product of an isocyanate component and an isocyanate-reactive component is disposed between the first preform and the second preform. The polymeric composition adheres the first surface layer to the second preform through the at least one first opening. The surface layer is adhered to the second preform during molding of the composite article and in the absence of additional adhesive, thereby reducing production time and cost of the composite article.

15 Claims, 2 Drawing Sheets

METHOD FOR MAKING A COMPOSITE ARTICLE

RELATED APPLICATIONS

This application is a divisional of and claims priority to and all the advantages of U.S. Non-Provisional patent application Ser. No. 11/677,062, filed on Feb. 21, 2007, claims priority to and all the advantages of U.S. Provisional Patent Application No. 60/776,294, filed on Feb. 24, 2006.

BACKGROUND OF THE INVENTION

1. Field of the Invention

The subject invention relates to a composite article including a surface layer and a method of making the composite article. More specifically, the subject invention relates to a composite article and a method of making the composite article including the surface layer adhered to a preform in the composite article.

2. Description of the Prior Art

Composite articles are typically made including a first preform, a second preform spaced from the first preform, and a polymeric composition disposed between the first preform and the second preform. The first and second preforms may be formed from wood or plastics. The polymeric composition functions to bond the first preform and the second preform together, thereby adding strength to the composite article.

The composite articles are made through a closed mold process in a mold having a mold surface that defines a mold cavity. The first preform and the second preform are placed in the mold cavity with the preforms spaced from and in overlying relationship to each other. The mold cavity is closed and the polymeric composition is introduced between the first preform and the second preform. The polymeric composition hardens or cures between the first preform and the second preform to adhere the first preform and the second preform together. The composite article is then demolded from the mold cavity. Such methods of making composite articles are known in the art.

Due to their strength, the composite articles have many practical uses, such as for use as floorboards in automotive applications. Floorboards typically include a carpet layer disposed adjacent to the second preform and on an opposite side of the second preform from the first preform. The carpet layer is adhered to the second preform after the composite article is demolded from the mold by applying an adhesive to the second preform and pressing the carpet layer and the second preform together. However, continuous lamination processes are not feasible when the composite article is used due to rigidity of the composite article, making it time-consuming to adhere the carpet layer in the composite article.

Alternatively, as described in U.S. Pat. No. 6,821,366 to Allison et al., the composite article is formed by stitching carpet fibers into a primary backing layer, then applying a secondary backing layer to the primary backing layer for providing support and rigidity and for allowing the carpet layer to be molded into a desired shape. The secondary backing layer may also be used to adhere the carpet layer to other components. Specifically, the secondary backing layer may be heated to achieve a desired tackiness, and then pressed onto the other components to adhere the composite article to the other components. This method requires many steps and additional materials that add to the cost of making the composite articles. Further, the composite article including the primary and secondary backing layers does not provide sufficient strength to be used, itself, in many load-bearing applications without adhering the composite article to the other components.

Thus, there is an opportunity to provide a composite article including a surface layer adhered to a preform, and a method of making the composite article including the surface layer adhered to the preform that eliminates one or more of the costly and time-consuming steps required to make the composite article, and that eliminates the need for unnecessary materials in the composite article that also increases the cost of the composite article.

SUMMARY OF THE INVENTION AND ADVANTAGES

The subject invention provides a composite article and a method of making the composite article. The composite article includes a first preform. A second preform is spaced from and in overlying relationship to the first preform. The second preform defines at least one first opening extending therethrough along an axis transverse to the first preform. A first surface layer is disposed adjacent to the second preform and on an opposite side of the second preform from the first preform. A polymeric composition is disposed between the first preform and the second preform. The polymeric composition includes the reaction product of an isocyanate component and an isocyanate-reactive component. The polymeric composition adheres the first surface layer to the second preform through the at least one first opening.

To make the composite article, a mold is provided having a mold surface. The mold surface defines a mold cavity. The first preform and the second preform are placed in the mold cavity with the preforms spaced from and in overlying relationship to each other. The first surface layer is placed in the mold cavity between the second preform and the mold surface. A composition including the isocyanate component and the isocyanate-reactive component is introduced between the first preform and the second preform. The composition is also introduced through the at least one first opening for adhering the first surface layer to the second preform through the at least one first opening. The composite article is then demolded from the mold cavity.

The surface layer is adhered to the second preform in the mold cavity and in the absence of additional adhesive, since the composition that is introduced between the first preform and the second preform is also introduced through the at least one first opening to adhere the first surface layer to the second preform. By eliminating the use of the additional adhesive, the cost for the composite article is reduced. Further, by adhering the first surface layer to the second preform in the mold cavity, the additional steps of applying adhesive to the second preform and pressing the first surface layer and the second preform together are unnecessary, thereby reducing production time for the composite articles. The composite article, by including the preforms in addition to the polymeric composition that includes the reaction product of the isocyanate component and the isocyanate-reactive component therebetween, provides sufficient strength and rigidity for many applications for which a single layer of the polymeric composition, or for which the preforms alone, would not be fit.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
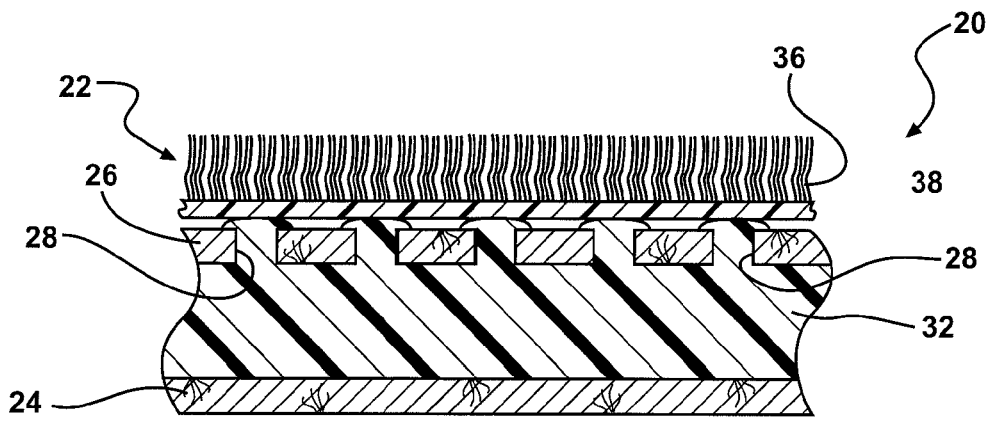
FIG. 1 is a cross-sectional side view of one embodiment of a composite article of the subject invention including a first surface layer adhered to a second preform.
Figure 2:
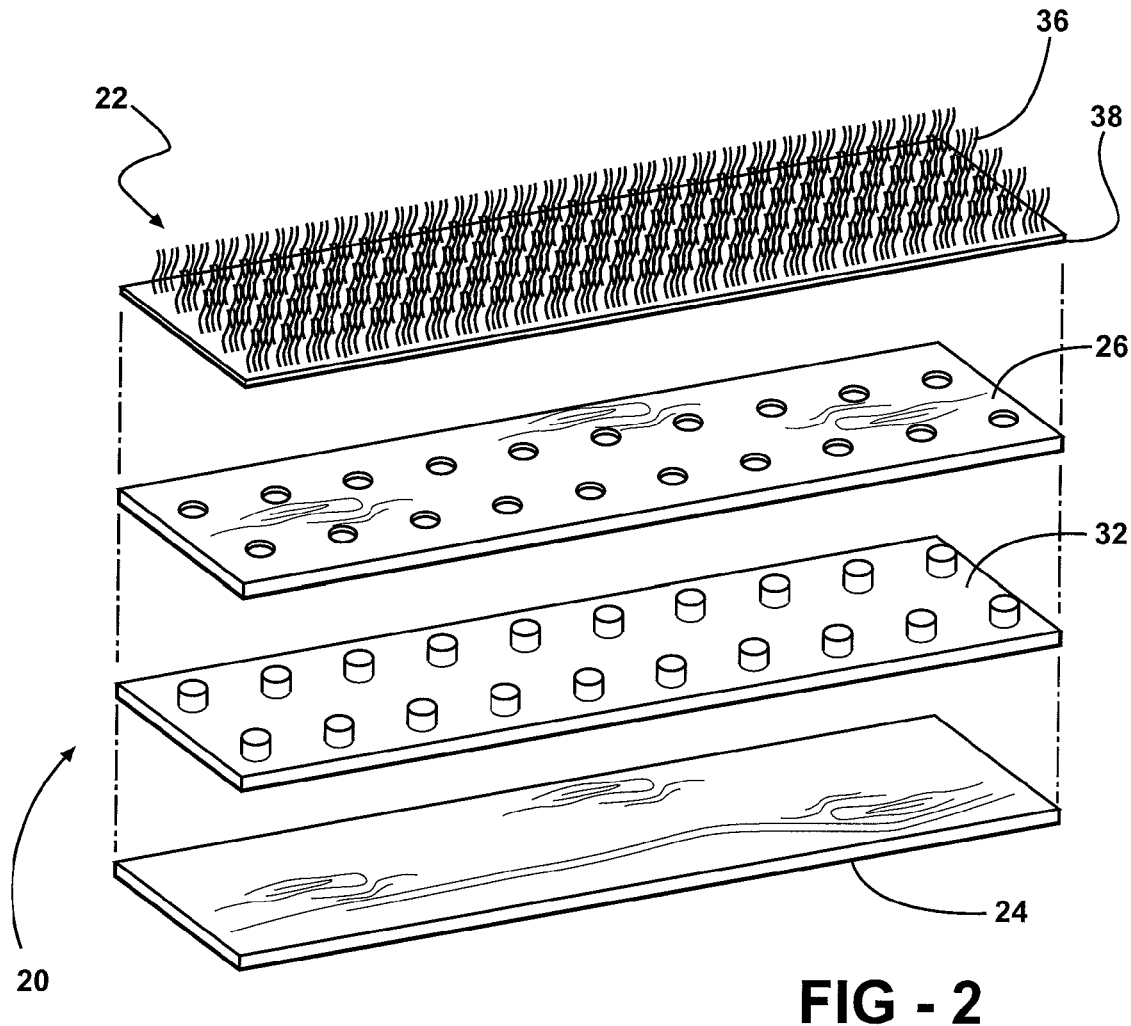
FIG. 2 is an exploded perspective side view of the composite article of FIG. 1.

Referring to the Figures, wherein like numerals indicate corresponding parts throughout the several views, a composite article is shown generally at 20 in FIG. 1. The composite article 20 is useful for many applications, such as for floorboards in automotive applications. Additionally, the composite article 20 is useful for a variety of other applications wherein a first surface layer has been traditionally adhered to a preform in a composite article with an adhesive.

Referring to FIGS. 1-4, the composite article 20 includes a first preform 24. A second preform 26 is spaced from and overlies to the first preform 24. The preforms 24, 26 are typically spaced at least 0.25 inches apart, more typically from about 0.25 to about 4 inches apart, most typically about 0.5 inches apart. The preforms 24, 26 are typically formed from a rigid material, as described in further detail below. The composite article 20 may be made to have exceptional strength and rigidity by including the preforms 24, 26 in the composite article 20 and by spacing the preforms 24, 26 from each other.

The preforms 24, 26 may have any desired shape or configuration, depending on the intended use. For example, when the composite article 20 is used as the floorboard in the automotive applications, the preforms 24, 26 may be pre-shaped to match a contour of a vehicle floor. For example, a preform mold (not shown) having a preform mold surface that defines a preform mold cavity shaped to match a desired shape of the preforms 24, 26 may be used to shape the preforms 24, 26 under heat, pressure, and, optionally, in the presence of steam.

As set forth above, in order to provide strength to the composite article 20, the preforms 24, 26 are typically formed from a rigid material. In one embodiment, the preforms 24, 26 are formed from wood, such as a wood/resin formulation or a urethane hardboard. One specific example of a preform that is suitable for purposes of the present invention is formed from wood hardboard commercially available as GP Superwood® hardboard from Georgia Pacific Corporation of Augusta, Georgia. Alternatively, the preforms 24, 26 may be formed from a polymeric material, and may be fiber-reinforced to achieve a desired strength and rigidity of the composite article 20. Suitable polymeric materials for the preforms 24, 26 include thermoplastic polyurethane, acrylonitrile-butadien-styrene, polycarbonate, nylon, and copolymers thereof. In yet another embodiment, the preforms 24, 26 may be formed from a sheet of metal, such as aluminum.

The second preform 26 defines at least one first opening 28, which may be a series of first openings 28, extending therethrough along an axis transverse to the first preform 24. More specifically, the at least one first opening 28 extends from a space defined between the first preform 24 and the second preform 26 to an exterior of the second preform 26 for reasons to be described in further detail below. In one embodiment, the first preform 24 defines at least one second opening 30, typically a series of second openings 30, in the same manner as the second preform 26 defines the at least one first opening 28. In one embodiment, the openings 28 may be further defined as holes that are from about 0.125 to about 0.375 inches in diameter, typically about 0.25 inches in diameter. The second preform 26 typically resembles a pegboard with the series of first openings 28 uniformly distributed throughout the second preform 26. When the first preform 24 defines the at least one second opening 30, the first preform 24 is similarly configured to the second preform 26. In another embodiment, the at least one first opening 28 is further defined as a slot that forms a pattern (not shown) in the second preform 26. The pattern may be formed to allow the polymeric composition to adhere the first surface layer 22 at different points along the second preform 26.

Referring to FIGS. 1-4, a polymeric composition 32 is disposed between the first preform 24 and the second preform 26. The polymeric composition 32 adheres the first preform 24 and the second preform 26 together. One or more of the preforms 24, 26 may be at least partially pre-coated with a polyurea or a polyurethane in order to promote adhesion between the polymeric composition 32 and the preforms 24, 26.

The polymeric composition 32 includes the reaction product of an isocyanate component and an isocyanate-reactive component in the presence of a blowing agent. The composition 40 introduced between the preforms 24, 26 includes the isocyanate component, the isocyanate-reactive component, and the blowing agent, and is therefore different from the polymeric composition 32, which includes the reaction product of the isocyanate component and the isocyanate-reactive component in the presence of the blowing agent, i.e., the isocyanate component and the isocyanate-reactive component after curing and after blowing.

Preferably, the isocyanate component is selected from the group of diphenylmethane diisocyanate, polymeric diphenylmethane diisocyanate, liquid-modified pure diphenylmethane diisocyanate, and combinations thereof. Examples of suitable isocyanate components include, but are not limited to, Elastocast® 70750T, Lupranate® M20S, and Lupranate® MP102, all commercially available from BASF Corporation of Wyandotte, Mich. Other suitable isocyanate components include, but are not limited to, conventional aliphatic, cycloaliphatic, araliphatic and aromatic isocyanates. The isocyanate component may also be a pre-polymer. That is, the isocyanate component may be a polyisocyanate initiated pre-polymer including a polyisocyanate. Typically, the isocyanate component is present at an isocyanate index of from about 95 to about 300, more typically about 110.

The isocyanate-reactive component typically has an average nominal functionality of at least 3. By average nominal functionality, it is meant that the functionality is based upon the functionality of the initiator molecule, rather than the actual functionality of the polyol after manufacture. Suitable isocyanate-reactive components including a nominal functionality of at least 3 include glycerine-initiated, trimethylol-propane-initiated, and sucrose-initiated polyether polyols and polyamines, and combinations thereof. Polymeric compositions 32 that are formed with the isocyanate-reactive component having the nominal functionality of at least 3 are typically referred to as "rigid" polymers, as opposed to flexible polymers. The rigid polymers help to strengthen the composite article 20. Preferably, the isocyanate-reactive component has an average nominal functionality of about 3. It is to be appreciated that the isocyanate-reactive component may include a mixture of polyols and/or polyamines, and may include individual polyols and/or polyamines having a nominal functionality of less than 3. In addition, for some applications, the isocyanate-reactive component may have an average nominal functionality of less than 3. More specifically, the isocyanate-reactive component having the average nominal functionality of less than 3 may include a mixture of polyols and/or polyamines, and may include individual polyols and/or polyamines having nominal functionalities above 3.

The composition 40 including the isocyanate component and the isocyanate-reactive component may also include various additives. The additives may be added to the composition 40 on the isocyanate-reactive component side, on the isocyanate side, or independently from the isocyanate component and the isocyanate-reactive component. Suitable additives that may be included in the composition 40 include cross-linking agents, chain extenders, catalysts, flame retardants, fillers, and surfactants, depending on the desired physical properties of the resulting polymeric composition 32.

Typically, the total amount of isocyanate-reactive component present in the composition 40 is from about 40 to about 98, more typically about 94 parts by weight, based on the total weight of the isocyanate-reactive component plus all additives in the composition 40.

As set forth above, the composition 40 includes, and the polymeric composition 32 is formed in the presence of, the blowing agent. The blowing agent may be either a chemical blowing agent or a physical blowing agent. Typically, the blowing agent is a chemical blowing agent, such as water; however, mixtures of chemical and physical blowing agents are also contemplated for purposes of the present invention.

Figure 3:
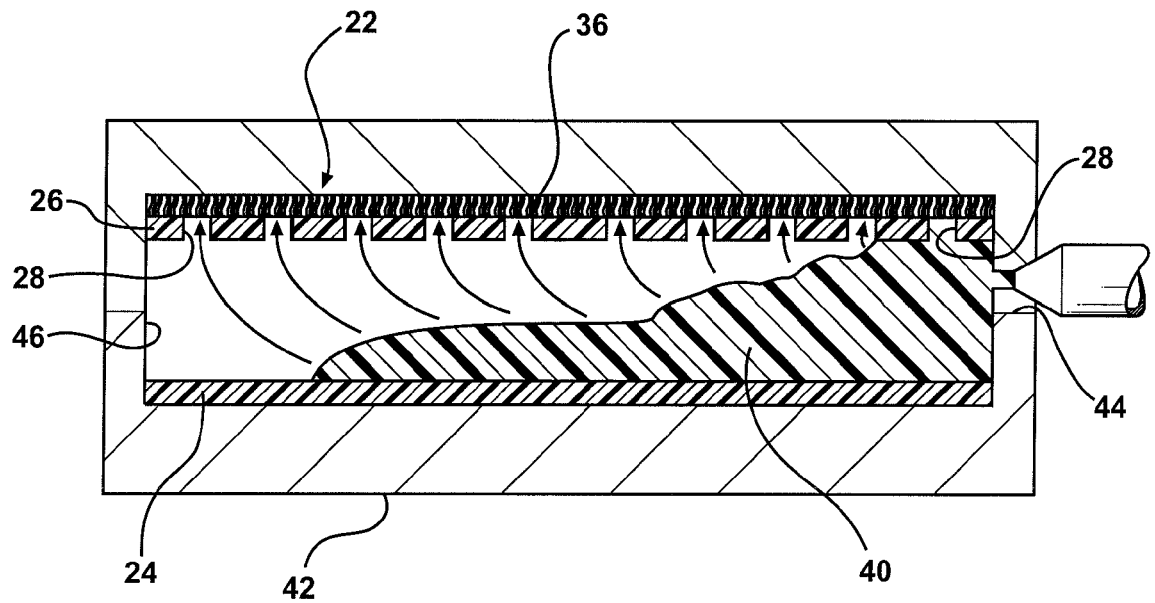
FIG. 3 is a cross-sectional side view of a mold having a mold surface defining a mold cavity with a first preform and the second preform spaced from the first preform and a composition being introduced between the first preform and the second preform and through first openings in the second preform for adhering the first surface layer to the second preform.
Figure 4:
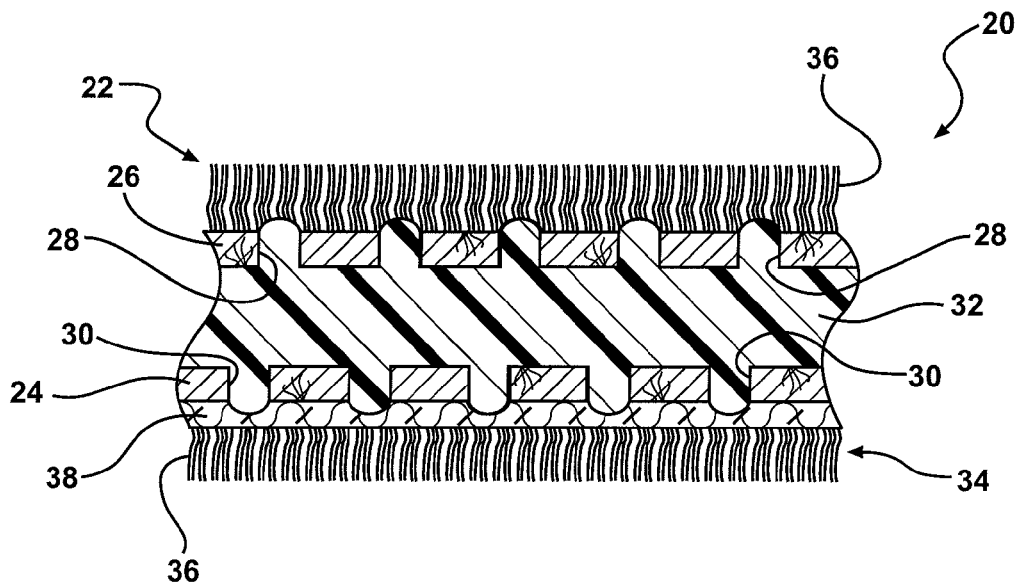
FIG. 4 is a cross-sectional side view of another embodiment of the composite article of the subject invention including a second surface layer adhered to the first preform with the surface layers including a backing disposed between the surface layers and the respective preforms.

In addition to the first preform 24, the second preform 26, and the polymeric composition 32, the composite article 20 further includes a first surface layer 22 disposed adjacent to the second preform 26 and on an opposite side of the second preform 26 from the first preform 24, as shown in FIGS. 1-4. Optionally, as shown in FIG. 4, the composite article 20 may include the second surface layer 34 disposed adjacent to the first preform 24 and on an opposite side of the first preform 24 from the second preform 26. The first surface layer 22 and the second surface layer 34 may be formed from the same material or from different materials, depending on the application.

In one embodiment, the surface layers 22 include a fibrous material 36, such as carpet fibers, when the composite article 20 is used as the floorboard in the vehicle applications. Additionally, as shown in FIGS. 1 and 4, the surface layers 22 may include a backing 38, such as a fibrous mat (as shown in FIG. 4) or a polymeric film (as shown in FIG. 1), disposed between the fibrous material 36 and the respective preform 24, 26, with the fibrous material 36 adhered to the backing 38. The fibrous material 36 may be stitched or woven into the backing 38. Alternatively, the surface layers 22 may include a mat of fibrous material 36 or fabric absent the backing 38, as shown for the first surface layer 22 in FIG. 4.

In another embodiment, as shown in FIG. 1, one or more of the surface layers 22 may be formed from a polymer. More specifically, although FIG. 1 shows the first surface layer 22 including the fibrous material and a backing 38 that is a polymeric film 38, it is to be appreciated that the polymeric film 38 may be present absent the fibrous material 36. For example, one of the surface layers 22 may be a show surface having a desired appearance, such as glossy, textured, or patterned surface. As another example, one of the surface layers 22 may be a foam backing (not shown). Suitable polymers for the surface layers 22 include any polymer that exhibits adhesion with the polymeric composition 32 disposed between the first preform 24 and the second preform 26, typically with an adhesion strength of at least 5 psi. Suitable polymers typically have active hydrogen molecules on a surface thereof to facilitate adhesion. For example, one or more of the surface layers 22 may be formed from acrylonitrile-butadiene-styrene, nylon, polycarbonate, melamine, any cellulosic composite, cellulosic thermoplastic composites with a cellulosic portion in excess of 10 parts by weight, polyester fabrics, jute-backed fabrics, olefinic-based polymers, thermoplastic polyurethane, and combinations thereof.

The first surface layer 22 is adhered to the second preform 26 through the at least one first opening 28. More specifically, during molding, the composition 40 that is introduced between the first preform 24 and the second preform 26 is also introduced through the at least one first opening 28. When the first surface layer 22 includes the fibrous material 36, the composition 40 may be introduced through the at least one first opening 28 and into the first surface layer 22, as shown in FIGS. 1 and 4. Alternatively, when the first surface layer 22 includes the backing 38 disposed between the fibrous material 36 and the second preform 26, the composition 40 may be introduced through the at least one first opening 28 and may spread between the backing 38 and a surface of the second preform 26, as shown in FIG. 1. Optionally, the composition 40 may be introduced into the backing 38 and further into the fibrous material 36, as shown for the second surface layer 22 in FIG. 4. When the first surface layer 22 is formed from the polymer, the composition 40 may be introduced through the at least one first opening 28 and may spread between the first surface layer 22 and the surface of the second preform 26, thereby adhering the first surface layer 22 and the second preform 26 together as shown in FIG. 1. When the first preform 24 defines the at least one second opening 30, and when the second surface layer 34 is present, the composition 40 introduced between the first preform 24 and the second preform 26 may similarly be introduced through the at least one second opening 30 in the first preform 24 to adhere the second surface layer 34 to the first preform 24 in the same manner as described above relative to the first surface layer 22.

The composite article 20 typically has sufficient strength to withstand at least 250 lbs of force over a two-foot by two-foot section, which is sufficient for the composite article 20 to be suitable for many load-bearing applications.

The composite article 20 is made in a mold 42 having a mold surface 44 that defines a mold cavity 46. To make the composite article 20, the first preform 24 and the second preform 26 are placed in the mold cavity 46 with the preforms 24, 26 spaced from and in overlying relationship to each other. The first surface layer 22 is placed in the mold cavity 46 between the second preform 26 and the mold surface 44, typically prior to placing the second preform 26 in the mold cavity 46. As shown in FIG. 3, the composition 40 is then introduced between the first preform 24 and the second preform 26 and through the at least one first opening 28 in the second preform 26 for adhering the first surface layer 22 to the second preform 26 through the at least one first opening 28. As such, a separate adhesive and a separate step of adhering the first surface layer 22 to the second preform 26 are unnecessary.

Typically, the composition 40 is introduced under pressure in order to force the composition 40 through the at least one first opening 28 in the second preform 26 and either into or into contact with the first surface layer 22. Alternatively, when the first surface layer 22 includes the fibrous material 36 or other porous material, a vacuum (not shown) may be applied to the mold cavity 46 through the mold 42 adjacent to the first surface layer 22 in order to pull the composition 40 between the first preform 24 and the second preform 26 and through the at least one first opening 28 and into the first surface layer 22 in order to adhere the first surface layer 22 to the second preform 26. When the polymeric composition 32 is the foam formed in the presence of the blowing agent, expansion of the foam between the first preform 24 and the second preform 26 in the mold 42 may also result in the composition being introduced through the at least one first opening 28 to adhere the first surface layer 22 to the second preform 26 through the at least one first opening 28.

When the second surface layer 34 is present, the second surface layer 34 may be adhered to the first preform 24 through the at least one second opening 30 in the same manner as described above relative to adhering the first surface layer 22 to the second preform 26. Specifically, the second surface layer 34 may be placed between the first preform 24 and the mold surface 44, typically prior to placing the first preform 24 in the mold cavity 46. The composition 40 may then be introduced between the first preform 24 and the second preform 26 and through the at least one first opening 28 in the second preform 26 for adhering the first surface layer 22 to the second preform 26 and for adhering the second surface layer 34 to the first preform 24 through the at least one second opening 30 in the first preform 24 for adhering the second surface layer 34 to the first preform 24 through the at least one second opening 30.

After introducing the composition 40 between the first preform 24 and the second preform 26 and through the at least one first opening 28 and, optionally, through the at least one second opening 30 in the first preform 24, the composition 40 is cured or cooled in order to harden the composition 40, depending on the specific composition, in order to form the polymeric composition 32. Once the polymeric composition 32 is formed, the composite article 20 is demolded from the mold cavity 46 and includes the first surface layer 22 and, optionally, the second surface layer 34 adhered to the second preform 26 and the first preform 24, respectfully.

EXAMPLES

Composite articles are made in accordance with the method of the present invention. More specifically, a mold is provided having a mold surface that defines a mold cavity. A first preform and a second preform are provided. The first preform is a sheet of GP Superwood® hardboard that is free of openings or holes. The second preform is a sheet of GP Superwood® hardboard defining a series of first holes that are each about 0.25 inches in diameter and that are spaced about 0.5 inches from each other. A first surface layer including a fibrous material and a backing, i.e., a carpet layer, is placed in the mold cavity. The carpet layer is an automotive-grade carpet and includes a backing formed from a polymeric film. The second preform is placed into the mold over the first surface layer to sandwich the first surface layer between the second preform and the mold surface. The first preform is also placed in the mold and is spaced about 0.5 inches from the second preform in order to allow a composition to be introduced between the first preform and the second preform 26. The composition includes the components set forth in Table 1 below.

TABLE 1

| Component | Amount, parts by weight |
| --- | --- |
| Polyol A | 66.04 |
| Polyol B | 28.30 |
| Additive A | 1.89 |
| Additive B | 0.47 |
| Additive C | 0.47 |
| Additive D | 2.83 |
| Total | 100.00 |
| Isocyanate | 121.87 |
| NCO % | 31.4 |
| Isocyanate Index | 100 |
| Total | 100.00 |

Polyol A is a glycerine and sucrose-initiated polyether polyol having 100% propylene oxide with a number average molecular weight of about 700 and an OH value of from 350 to 370 mg KOH/g commercially available from Carpenter Company of Richmond, Va.

Polyol B is a glycerine-initiated polyether polyol having 100% propylene oxide with a number average molecular weight of about 700 and an OH value of about 230 mg KOH/g commercially available from BASF Corporation of Wyandotte, Mich.

Additive A is rigid polyether surfactant commercially available from Degussa Corporation of Parsippany, N.J.

Additive B is dimethylcyclohexylamine catalyst.

Additive C is a 33% TEDA catalyst in propylene glycol commercially available from Air Products and Chemicals Co. of Allentown, Pa.

Additive D is water.

The polyols and the additives are mixed together and maintained at a temperature of about 80° F. and a pressure of about 2000 psi, and the isocyanate is also maintained at the temperature of about 80° F. and a pressure of about 2000 psi, prior to mixing. The polyols, additives, and the isocyanate are then mixed together in a 14 mm mixhead cannon to form the composition. The composition is introduced between the first preform and the second preform and through at least some of the first holes in the second preform to adhere the first surface layer to the second preform 26. The mold is maintained at a temperature of about 120° F. and the composite article remains in the mold for a period of from about 3 to about 5 minutes in order to cure the composition and form the polymeric composition in the composite article. The composite article is then demolded from the mold cavity.

The composite article exhibits excellent adhesion between the first surface layer and the second preform. More specifically, an adhesion strength between the first surface layer and the second preform is at least 5 psi. However, adhesion between the first surface layer and the second preform is typically greater than adhesion strength between the polymeric composition and the respective preforms, making it difficult to determine actual adhesion strength between the first surface layer and the second preform.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of making a composite article (20) comprising the steps of:
    providing a mold (42) having a mold surface (44) defining a mold cavity (46);
    positioning a first preform (24) and a second preform (26) in the mold cavity (46) with the preforms (24, 26) spaced from and opposing each other, wherein the second preform (26) comprises openings (28) extending therethrough along an axis transverse to the first preform (24);
    positioning a first surface layer (22) in the mold cavity (46) between the second preform (26) and the mold surface (44) on an opposite side of said second preform (26) from said first preform (24);
    introducing a composition (40) comprising an isocyanate component, an isocyanate-reactive component, and a blowing agent between the first preform (24) and the second preform (26) and through the openings (28);
    forming the composite article by curing the introduced composition (40) into a polymer composition (32) adhering the first preform (24) to the second preform (26) and adhering the first surface layer (22) to the second preform (26) through the openings (28); and
    demolding the resulting composite article (20) from the mold cavity (46).

2. A method as set forth in claim 1 wherein the first surface layer (22) comprises a fibrous material (36).

3. A method as set forth in claim 2 wherein the first surface layer (22) further comprises a backing (38) disposed between the fibrous material (36) and the second preform (26) with the fibrous material (36) adhered to the backing (38).

4. A method as set forth in claim 3 wherein the backing (38) is a fibrous mat.

5. A method as set forth in claim 3 wherein the backing (38) is a polymeric film.

6. A method as set forth in claim 1 wherein the first preform (24) comprises openings (30) extending therethrough along an axis transverse to the second preform (26).

7. A method as set forth in claim 6 wherein a second surface layer (34) is positioned between the first preform (24) and the mold surface (44) on an opposite side of said first preform (24) from said second preform (26).

8. A method as set forth in claim 7 wherein the composition (40) is introduced through the openings (30) in the first preform (24) for adhering the second surface layer (34) to the first preform (24) therethrough upon curing.

9. A method as set forth in claim 1 wherein the isocyanate-reactive component has an average nominal functionality of at least 3.

10. A method as set forth in claim 9 wherein the isocyanate-reactive component is further defined as a glycerine-initiated polyol.

11. A method as set forth in claim 1 wherein the isocyanate-reactive component has an average nominal functionality of less than 3.

12. A method as set forth in claim 1 wherein the first surface layer (22) is formed from a polymer material.

13. A method as set forth in claim 12 wherein the polymer material exhibits adhesion with the polymeric composition (32) disposed between the first preform (24) and the second preform (26) with an adhesion strength of at least 5 psi.

14. A method as set forth in claim 1 wherein at least one of the first preform (24) and the second preform (26) are formed from wood.

15. A method as set forth in claim 1 wherein at least one of the first preform (24) and the second preform (26) are formed from a polymeric material.

* * * * *